Aug. 14, 1945.  E. E. VAN HAM  2,382,946
LIQUID LEVEL GAUGE
Filed June 16, 1944  2 Sheets-Sheet 1
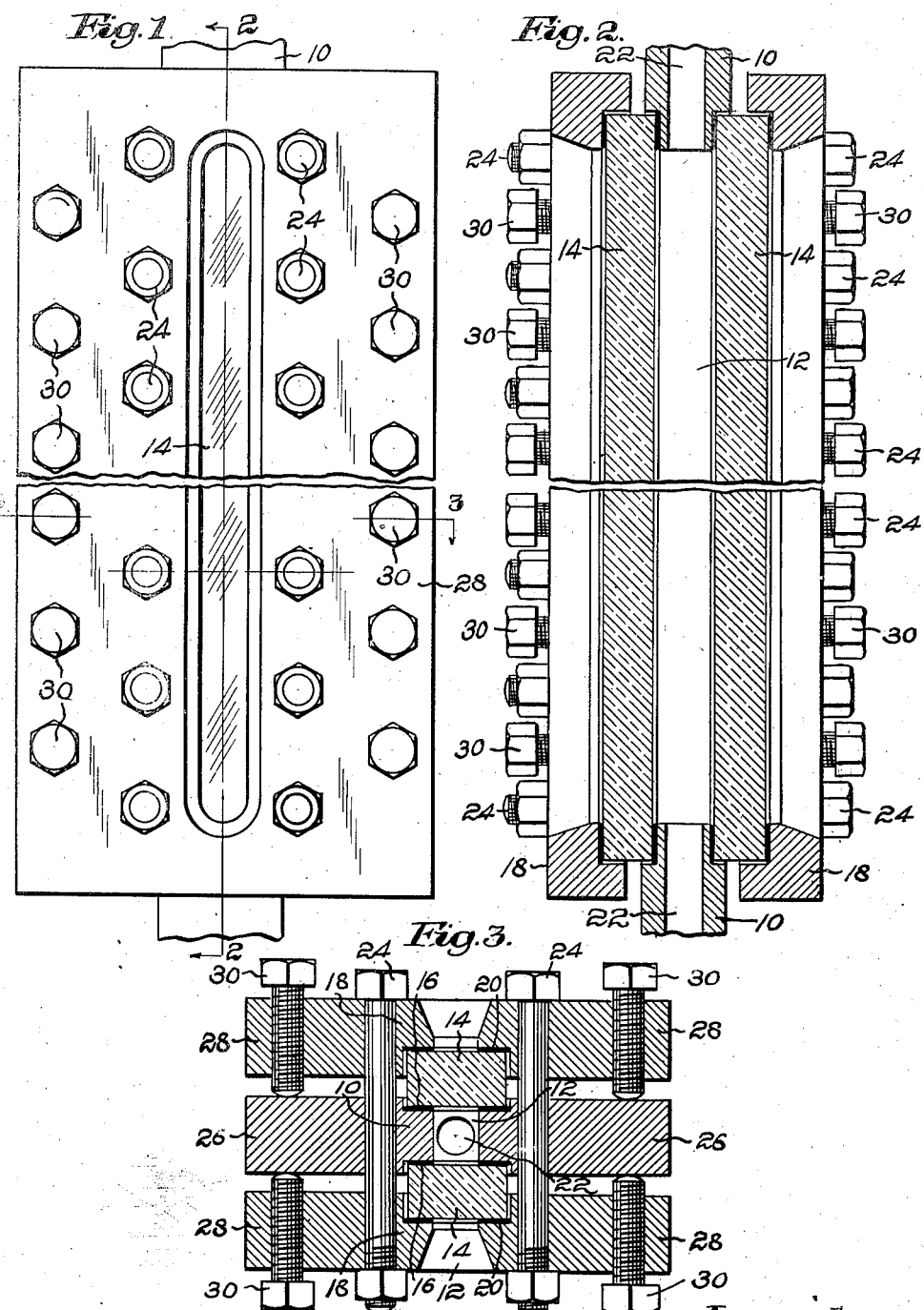
Inventor:
Ernest E. van Ham.

Aug. 14, 1945.  E. E. VAN HAM  2,382,946
LIQUID LEVEL GAUGE
Filed June 16, 1944  2 Sheets-Sheet 2
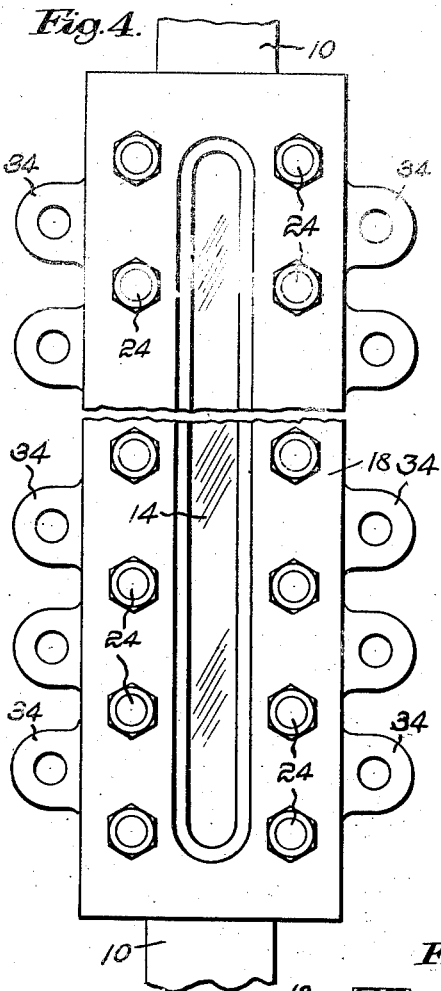
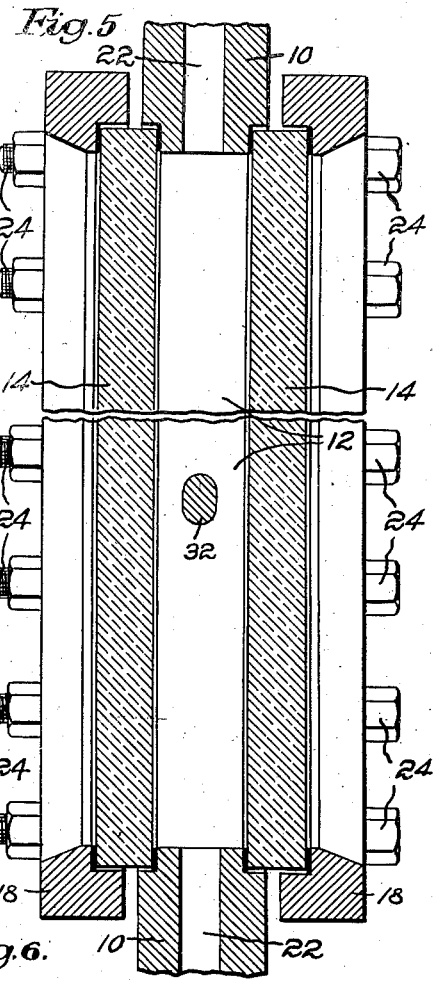
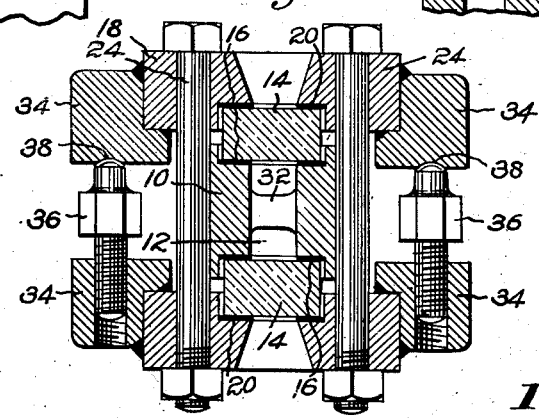
Inventor:
Ernest E. van Ham
by Emery, Booth, Townsend, Miller & Weidner
Attys.

Patented Aug. 14, 1945

2,382,946

UNITED STATES PATENT OFFICE 2,382,946

LIQUID LEVEL GAUGE

Ernest E. Van Ham, Somerville, Mass., assignor, by mesne assignments, to Jerguson Gage & Valve Co., Somerville, Mass., a corporation of Massachusetts Application June 16, 1944, Serial No. 540,625

7 Claims. (Cl. 73—329)

This invention relates to liquid level gauges, such as are used on steam boilers, and the object is to provide an improved construction of gauge adapted for use under conditions of high pressure.

My invention will be well understood by reference to the following description of illustrative embodiments thereof shown by way of example in the accompanying drawings, wherein:

Fig. 1 is a broken front elevation of a gauge illustrative of the invention;

Figs. 2 and 3 are sections on the lines 2—2 and 3—3 of Fig. 1 respectively; and

Figs. 4, 5 and 6 are views corresponding to Figs. 1, 2 and 3 respectively, showing a modified form.

In the accompanying description I shall use the words "interior" and "exterior" to denote relative position in a plane parallel to the glass of the gauge hereinafter referred to, that is, the plane of the paper viewing Fig. 1, and "inward" and "outward" to indicate relative position in a direction perpendicular to the glass, that is, upwardly or downwardly viewing Fig. 3.

In the drawings I have shown gauges of the double glass type, each comprising a body 10 formed with a vertical slot 12 which is covered at either side with a glass 14 which rests against a gasket 16 and is secured by a frame-like cover 18 having a flange which overlies the margin of the glass and presses against the same through an interposed cushion 20, the body and the two glasses thus defining a chamber to receive the indicating column. As best seen in Figs. 2 and 5, the covers 18 do not rest directly upon the body 10. Openings 22 in the end walls of the body provide for placing this chamber in communication with the body of liquid the height of which is to be measured and with the space above the same in the usual manner. The body and frames are here shown as rabbeted to receive the marginal portions of the glass and they are secured together by a series of bolts 24 along either side of the chamber. The construction as so far described is not in itself new. Usually the bolts 24 are placed as near as convenient to the edge of the glass so as to exert so far as possible a direct inward pressure thereon and they may be similarly placed in the present instance.

In the form of the invention shown in Figs. 1, 2 and 3 the body of the gauge is extended at either side beyond the positions of the bolts to provide the lateral portions 26. These as shown may be of the same thickness as the inner portions of the side walls of the chamber. In other words, the body including these lateral portions 26 may be formed by slotting a relatively wide bar of uniform thickness. We may consider the sides of the chamber including these extending portions 26 as beams of relatively great depth and correspondingly resistant to deflection toward the exterior under internal pressure. The covers 18 are provided with extensions 28 overlying the extended portions 26 and exteriorly of the bolts 24 I provide suitable adjustable means, herein shown as jack screws 30 threaded into the extensions 28 and bearing on the extended portions 26, by means of which an outward pressure may be exerted on the exterior margins of the cover which tends to hold the interior margins against the glasses 14 and prevents bowing of the covers when the bolts 24 are set up. Desirably, as seen in Fig. 1, the jack screws 30 may be staggered relatively to the bolts 24. Viewing Fig. 3, it will be seen that the jack screws act to tension the side portions of the cover in the manner of levers of the first class to hold the interior margins thereof against the glass.

In the form of the invention shown in Figs. 4, 5 and 6, the laterally extending portions 26 of the body are omitted. If necessary or desirable to provide increased resistance to deflection of the sides of the body toward the exterior, one or more integral ties 32 may extend across the slot 12 securing together the side walls of the chamber. As seen in Fig. 6, the bolts 24 which tie together the covers 18 and press them against the body may pass closely adjacent the sides of the body to give lateral support of the same.

The extensions 34 of the covers corresponding in a way to the extensions 28 of the modification previously described herein take the form of lugs welded to the margins of the covers and forming an integral part thereof and bolts 36 threaded into the lugs of one of the covers and having rounded heads engaging depressions 38 in the inner faces of the opposing lugs of the other cover provide means when backed out from the female thread for forcing apart the exterior margins of the two covers, exerting thereon an outward pressure which, as in the previous example, supports the covers against flexure and holds the interior margins thereof against the glass.

It will be noted that the screws 30 or 36 act with favorable mechanical advantage relative to the inner margin of the covers. The tension required in setting them up is therefore relatively moderate. If a so-called torque wrench having means for indicating or predetermining the force exerted is used for this purpose, the required force will be within a range wherein the indications of the wrench are more reliable. The desirable end of uniformly exerted pressures clamping together the parts of the gauge is thereby rendered more easy of attainment.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. A liquid level gauge comprising a chambered body, a glass cooperating therewith to define a receptacle for the liquid column, a frame-like cover overlying the margins of the glass, bolts through the cover and body for pressing the former inwardly and adjustable means exterior of the bolts for applying outward pressure to the exterior portion of the cover to hold the interior margin thereof against the glass.

2. A liquid level gauge comprising a slotted body, glasses at either side thereof defining a receptacle for the liquid column, frame-like covers for the glasses overlying the margins thereof, bolts pressing the glasses inwardly toward the body, the sides of the body being substantially extended beyond the location of the bolts to support the sides of the body against deflection toward the exterior, the covers having exterior extensions overlying the extended portions of the body, and jack screws between said extensions and extended portions to apply outward pressure to the former to hold the interior margins of the covers against the glass.

3. A liquid level gauge comprising a slotted body, glasses at either side thereof defining a receptacle for the liquid column, frame-like covers for the glasses overlying the margins thereof, bolts pressing the glasses inwardly toward the body, a tie crossing the slot of the body and securing together its sides against deflection to the exterior, the covers having extensions beyond the location of said bolts and adjusting screws cooperating with the extensions to apply outward pressure thereto to hold the interior margins of the covers against the glass.

4. A liquid level gauge comprising a slotted body, glasses at either side thereof defining a receptacle for the liquid column, frame-like covers for the glasses overlying the margins thereof, bolts pressing the glasses inwardly toward the body, the covers having extensions beyond the location of said bolts and adjusting screws cooperating with the extensions to apply outward pressure thereto to hold the interior margins of the covers against the glass.

5. A liquid level gauge comprising a slotted body, glasses at either side thereof defining a receptacle for the liquid column, frame-like covers for the glasses overlying the margins thereof, bolts pressing the glasses inwardly toward the body, the covers extending exteriorly beyond the location of said bolts, and means interposed between the so extended portions of the covers for adjustably pressing them apart thereby to hold the interior margins of the covers against the glass.

6. A liquid level gauge comprising a chambered body, a glass cooperating therewith to define a receptacle for the liquid column, a frame-like cover overlying the margins of the glass, bolts through the cover and body for pressing the former inwardly, the sides of the body being extended toward the exterior beyond the location of the bolts, the covers having exterior extensions overlying said extended portions, and jack screws between said extensions and extended portions to apply outward pressure to the former to hold the interior margin of the cover against the glass.

7. A liquid level gauge comprising a chambered body, a glass cooperating therewith to define a receptacle for the liquid column, a frame-like cover overlying the margins of the glass, and means for securing the cover to the body comprising devices at different distances laterally from the opening of the cover severally adjustable transversely of the body whereby the side portions of the cover may be tensioned about an adjustably positioned fulcrum in the manner of levers of the first class to hold the interior margin of the cover against the glass.

ERNEST E. van HAM.